United States Patent
Danne et al.

[11] 3,908,107
[45] Sept. 23, 1975

[54] DEVICE FOR THE CONTROL OF THE LIQUID LEVEL IN A RECEPTACLE

[75] Inventors: Ulrich Danne; Friedrich Roters, both of Wolfsburg, Germany

[73] Assignee: Volkswagenwerk Aktiengesellschaft, Wolfsburg, Germany

[22] Filed: Jan. 16, 1974

[21] Appl. No.: 433,719

[30] Foreign Application Priority Data
Jan. 31, 1973 Germany.............................. 2304521

[52] U.S. Cl............... 200/84 R; 340/59; 340/244 B
[51] Int. Cl. ............................................. H01h 35/18
[58] Field of Search .... 200/84 R, 84 B, 84 C, 83 N; 340/244 B, 59; 73/308, 317, 313

[56] References Cited
UNITED STATES PATENTS

| | | | |
|---|---|---|---|
| 2,006,608 | 7/1935 | Smulski............................. | 200/84 R |
| 2,071,042 | 2/1937 | Maurer.............................. | 200/83 N |
| 3,671,695 | 6/1972 | Wing.................................. | 200/84 R |

FOREIGN PATENTS OR APPLICATIONS

| | | | |
|---|---|---|---|
| 1,590,894 | 10/1970 | Germany........................... | 200/84 R |
| 430,101 | 6/1935 | United Kingdom................ | 200/84 R |

Primary Examiner—David Smith, Jr.
Attorney, Agent, or Firm—Ernest F. Marmorek

[57] ABSTRACT

The present invention provides improved means for monitoring and/or controlling the level of a liquid in a receptacle such as an hydraulic motor vehicle brake system. A float is positioned below the level of the liquid in the receptacle and is supported on one arm of a bell crank lever that is pivoted with respect to the receptacle. A fluid impervious, flexible partition plate is positioned within the receptacle and defines, in part, a chamber that is isolated from the fluid. A second arm of the bell crank lever is coupled to the partition plate. Within the isolated chamber there is provided fixed contact means. Movable contact means which are also provided within the chamber are coupled to and are movable together with the partition plate. The two contact means are part of a signal circuit. When the level of the liquid is lowered the float will also be lowered thereby moving the second arm of the lever together with the partition plate and one of the contact means in a direction away from the other contact means so that the electrical circuit is broken and a signal is thereby generated.

14 Claims, 1 Drawing Figure

US Patent  Sept. 23,1975  3,908,107
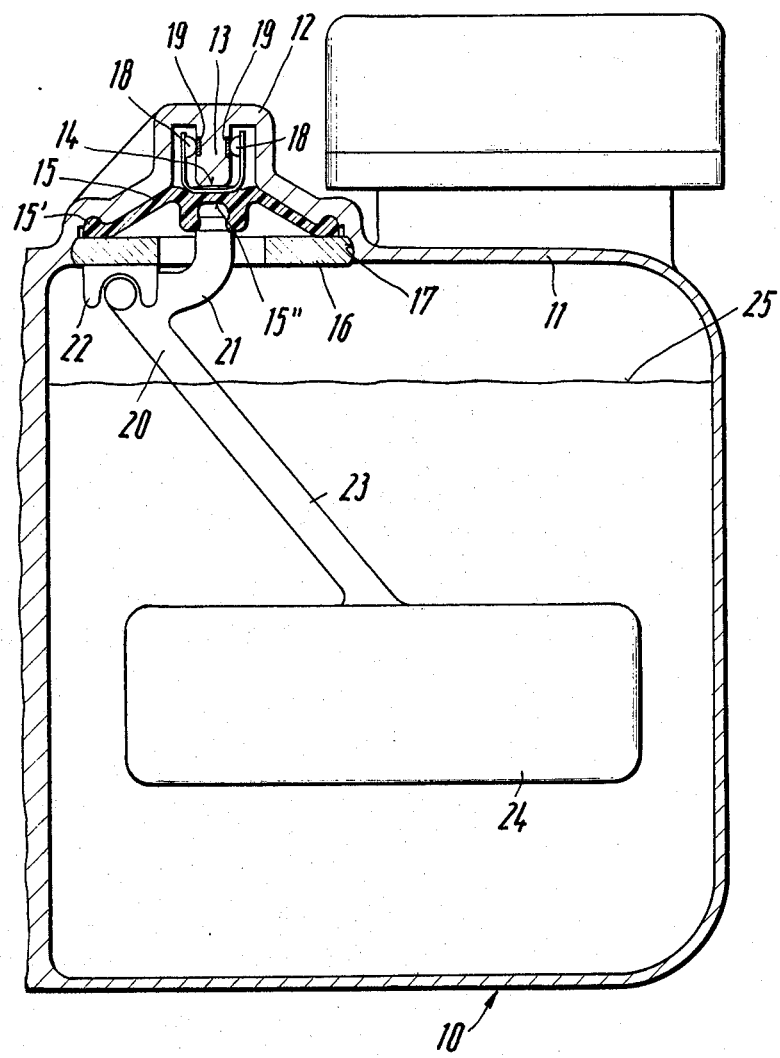

DEVICE FOR THE CONTROL OF THE LIQUID LEVEL IN A RECEPTACLE

BACKGROUND OF THE INVENTION

1. Field of the Invention

This invention relates generally to liquid level control means and more particularly to improved means for isolating the contact means of a signal circuit from the liquid the level of which is to be monitored.

More specifically the present invention relates to a liquid level control device having contact means in a signal circuit for monitoring and/or controlling the level of a liquid in a receptacle, for example in a refill container of an hydraulic motor vehicle brake system. The contact means are acted upon by a lever which is secured to a float and which is also hinged or pivotaly mounted relative to the container. The contact means are separated from the lever by means of a flexible partition which is impervious to liquid.

2. Description of the Prior Art

A float switch of the above described type is known through the laid-open German patent application No. 1,149,977 which discloses magnetic drive and off-drive members. In the normal mode of operation of the above noted German patent application, a contact member is maintained between two contacts by a float or buoyant member that floats on the liquid with the aid of the magnetic drive and off-drive members. When the liquid level drops one of the two contacts are placed in engagement with the contact member. However, in the aforementioned prior art device, when the liquid level rises, the other one of the two contact engages the contact member.

A device having the characteristics of the aforementioned German patent application can only be used in those environments where no vibrations occur. For use in a motor vehicle, for example, the movements and inclinations of the motor vehicle would continuously bring about an undesired engagement of one of the two contacts with the contact member.

Another prior art form of liquid level indicator for a refill container of an hydraulic motor vehicle brake system is disclosed in U.S. Pat. No. 3,577,121 wherein contact means used for controlling the liquid level are mounted in a manner such that they are protected from the liquid by means of a fluid impervious partition. However, in the above noted issued U.S. patent, the partition is in the form of a bellows which, upon a lowering of the liquid level, will expand or unfold so that the lower face or bottom section of the bellows will thereby follow the dropping liquid level. An insulating member which is positioned between a contact and a cooperating counter-contact will then be released from its original position.

On readily apparent drawback in the case of a device of the kind disclosed in the issued U.S. patent is that there is a possibility that the bellows will not unfold or expand due to aging of the material from which the bellows is made or in those situations in which the liquid level only drops slowly. Furthermore, it is entirely possible that the insulating member, through the vibrations of the motor vehicle, can be prematurely loosened from its original position. If, in order to compensate for expected vibrations, the force of the clamping action is increased, then the danger would exist that the insulating member would, unintentionally, remain in its original position even after the liquid level drops.

SUMMARY OF THE INVENTION

It is therefore one purpose of the instant invention to eliminate the disadvantages present in the case of a device made in accordance with the teaching of the laid-open German patent application. Therefore, the present invention provides a fluid impervious partition which, in part, defines a fluid isolated chamber and which is comprised of a flexible pressure plate against which, in the normal mode of operation and under the effect of the buoyant force of a float, a free extremity of one arm of a lever, for example a bell crank lever, is pressed. The surface of the pressure plate facing away from the lever is provided with at least one movable contact which cooperates with a stationary counter-contact, both contacts being located in the isolated chamber.

According to a further characteristic of the present invention, an arm of a lever urges a pressure plate against a stop member. The lever arm can be connected in a snap-in manner to a recessed area provided in the pressure plate.

Furthermore, the present invention provides means for sealingly retaining the marginal area of the pressure plate against an inner wall of the container by means of a ring-shaped or annular disc which is secured or snapped into a groove formed in the interior wall of the container. The lever may then be pivotally mounted on the ring-shaped disc.

Finally, the present invention provides that an upper container has a convexly protruding section in the internal area of which is arranged the pressure plate with two electrically conductive, mutually interconnected contacts mounted on the pressure plate as well as a cooperating pair of counter contacts subordinated to the first pair of contacts.

BRIEF DESCRIPTION OF THE DRAWING

In the drawing, the single, partially sectioned elevational view represent one embodiment of the present invention.

DESCRIPTION OF THE PREFERRED EMBODIMENT

A refill container 10 having an upper wall portion is shown in cross-section. The container 10 is part of an hydraulic motor vehicle brake system and, at its upper end, is provided with a convexly protruding section 12 having an inwardly directed lug 13 and a stop member 14. A flexible pressure plate 15, that is fluid impervious, is sealingly retained proximate marginal area 15' thereof against the upper container wall portion 11 of the refill container 10 by means of a ring-shaped disc 16 that is snapped into a groove 17 formed in the upper wall portion 11 of the refill container 10.

On the upper surface of the pressure plate 15, two electrically conductive contacts 18 are mutually interconnected by means of an electrically conductive, generally U-shaped strap. In the normal mode of operation, that is during the time in which the container 10 has either the quantity of fluid shown in the drawing or is completely filled with the brake fluid, the contacts 18 engage a counter-contact pair 19 located on the lug 13 and therewith actuate a signal circuit which is not illustrated.

On the side of the pressure plate 15 that is remote from or opposite the stop member 14 there is provided a recess 15'' into which one extremity of a lever arm 21 that is part of a pivotable bell crank 20, is snapped in. By means of a bearing 22, which may be molded together with or otherwise forms an integral part of the ring-like disc 16, the lever 20 is pivotally mounted on the disc 16 and is connected at the extremity of its other lever arm 23 to a float 24. Due to the effect of its buoyant force, the float 24 urges the free extremity of the lever arm 21 against the pressure plate 15 and the pressure plate 15 is, in turn, pressed against the stop member 14. Since during the normal mode of operation the float 24 lies below the liquid level 25 there is always the assurance, even in the presence of strong vibrations when the vehicle is operated on rough terrain as well as when the vehicle is positioned on an incline, that a secure contact is established between the pair of contacts 18 and the counter-contact pair 19.

If, due to a defect in the brake system, the liquid level 25 falls in a downward direction then the pressure plate 15 follows the lever arm 21 which moves in a direction away from the stop member 14 or downward as shown in the drawing. The pair of contacts 18 then separate from the counter-contact pair 19, as a result of which a signal in the signal circuit is generated.

The present invention can also find application in the case of a refill container used in a two-circuit brake system. Many other embodiments of the present invention are possible as well. That is, the pair of contacts 18 and their counter-contact pair 19 can be shaped in different ways and the snap-in type of connection at the recessed area 15'' can be dispensed with if, in the normal mode of operation, the pressure plate 15 is held with sufficient initial stress in a flexible or shock mounted manner on the lever arm 21.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a device having contact means which are part of a signal circuit and which serve for the control of the liquid level in a receptacle, for example a refill container of a hydraulic motor vehicle brake system, with the contact members being responsive to the movement of a lever which is secured to a float and which float is hingedly connected to the container, the contact means being arranged in a manner such that they are separated from the lever by means of a partition which is impervious to liquids, the improvement in which the partition comprises a flexible pressure plate against which a portion of the lever is pressed during the normal mode of operation due to the effect of the buoyant force of the float, the contact means being defined by at least one contact coupled to the surface of said pressure plate facing away from the lever and a stationary counter-contact cooperating with said one contact, further including sealing means for securing a marginal area of said pressure plate against an internal wall of the container, wherein said sealing means is a ring-shaped disc.

2. The improvement according to claim 1 wherein said disc is retained in a groove which is formed in the internal wall of the container.

3. The improvement according to claim 1 further including means for pivotally mounting said lever on said disc relative to the container.

4. The improvement according to claim 1 wherein the upper wall of the container includes a convexly protruding section in the internal area of which is arranged said pressure plate, the contact means being defined by a first pair of electrically conductive, mutually interconnected contacts as well as a second counter-contact pair adapted to selectively engage said first pair of contacts.

5. The improvement according to claim 1 further including a stop member against which said pressure plate is urged by said portion of the lever.

6. The improvement according to claim 1 further including a snap-in connection between said portion of the lever arm and said pressure plate.

7. The improvement according to claim 6 wherein said pressure plate includes a recess for receiving said portion of the lever arm.

8. A liquid level control device such as is used in conjunction with a hydraulic motor vehicle brake system having a signal circuit, said control device comprising the combination of:
   a. a receptacle for containing the liquid the level of which is to be controlled;
   b. a float positioned below the level of liquid in said receptacle;
   c. a lever pivotally mounted relative to said receptacle for supporting said float, said lever being responsive to the rise and fall of said float when the level of the liquid changes;
   d. a fluid impervious, flexible partition plate coupled to said lever, said partition plate defining a chamber that is separated from the liquid in said receptacle;
   e. first movable contact means integral with said plate, said first contact means being located in said chamber; and
   f. second, fixed contact means located in said chamber, said first and said second contact means being electrically connected to the signal circuit and to each other when the liquid is at or above a predetermined level, said first contact means being displaced from said second contact means by the movement of said float, said lever and said partition plate when the liquid falls below the predetermined level, whereby a signal is generated in the signal circuit,
   g. wherein said lever is a bell crank that is pivotally mounted relative to said receptacle, one arm of said bell crank being secured to said float, the other arm of said bell crank being secured to the surface of said partition plate that confronts the liquid in said receptacle,
   h. further including means for sealingly securing the marginal edge of said partition plate to said receptacle,
   i. wherein said sealing means is a ring-shaped disc and said other arm extends therethrough.

9. The control device according to claim 8 wherein said partition plate includes a recess for receiving said other arm of said bell crank.

10. The control device according to claim 8 wherein said bell crank is pivotally mounted on said ring-shaped disc.

11. The control device according to claim 8 wherein said receptacle includes a recess for receiving said ring-shaped disc.

12. The control device according to claim 8 wherein said first and said second contact means are each comprised of a pair of spacedly opposted conductive contacts.

13. The control device according to claim 12 further including a conductive U-shaped member for supporting said first contact means, said U-shaped member being located in said chamber and secured to the surface of said partition plate that is remote from the liquid in said receptacle and a post depending from said container in said chamber and in spaced opposition of said partition plate, said second contact means being secured to oppositely facing portions of said post and in confronting opposition to said first contact means.

14. The control device according to claim 13 wherein the end of said post that is in opposition to said partition plate defines a stop for limiting the movement of said partition plate when the level of the fluid in said receptacle is raised.

* * * * *